United States Patent
Zhu et al.

(10) Patent No.: US 8,190,157 B2
(45) Date of Patent: May 29, 2012

(54) FREQUENCY QUALITY CRITERIA FOR INTER-FREQUENCY HANDOVER IN A TD-CDMA COMMUNICATION SYSTEM

(75) Inventors: Yuan Zhu, Beijing (CN); Haiming Wang, Beijing (CN); Jiangeng Kang, Beijing (CN)

(73) Assignee: Intellectual Ventures I LLC, Wilmington, DE (US)

( * ) Notice: Subject to any disclaimer, the term of this patent is extended or adjusted under 35 U.S.C. 154(b) by 864 days.

(21) Appl. No.: 11/631,497

(22) PCT Filed: May 25, 2005

(86) PCT No.: PCT/IB2005/001429
§ 371 (c)(1),
(2), (4) Date: Feb. 10, 2009

(87) PCT Pub. No.: WO2006/008591
PCT Pub. Date: Jan. 26, 2006

(65) Prior Publication Data
US 2009/0207811 A1    Aug. 20, 2009

Related U.S. Application Data

(63) Continuation-in-part of application No. 10/891,829, filed on Jul. 14, 2004, now abandoned.

(51) Int. Cl.
*H04W 36/00* (2009.01)
*H04W 4/00* (2009.01)
(52) U.S. Cl. .............. 455/436; 455/437; 455/422.1; 370/331; 370/332
(58) Field of Classification Search .......... 455/422.1, 455/436–444; 370/331–334
See application file for complete search history.

(56) References Cited

U.S. PATENT DOCUMENTS

| | | | |
|---|---|---|---|
| 6,208,631 B1 | 3/2001 | Kim | |
| 6,327,472 B1 * | 12/2001 | Westroos et al. | ............. 455/450 |
| 6,701,150 B1 | 3/2004 | Huang et al. | |
| 6,968,192 B2 | 11/2005 | Longoni | |
| 7,197,318 B2 | 3/2007 | Schwarz et al. | |

(Continued)

FOREIGN PATENT DOCUMENTS

CN    1274252 A    11/2000

(Continued)

OTHER PUBLICATIONS

International Search Report and Written Opinion for PCT/IB2005/001429 mailed Nov. 14, 2005.

(Continued)

*Primary Examiner* — Michael Thier

(57) ABSTRACT

A method for determining whether to perform handover of a UE apparatus to a candidate cell and carrier frequency of a TD-CDMA telecommunications network (such as a TD-SCDMA network) based separately on coverage and capacity, using one decision metric for coverage (e.g. based on received signal code power for the candidate cell and carrier frequency) and a different decision metric for capacity (e.g. based on a quantity proportional to the received signal code power for the candidate cell and carrier frequency and inversely proportional to a measure of total interference in the candidate cell on the carrier frequency. Corresponding equipment and a computer program product are also provided. In deciding whether handover is needed based on capacity, a threshold for received signal code power may be used in addition to the metric for capacity.

20 Claims, 2 Drawing Sheets

U.S. PATENT DOCUMENTS

| | | | |
|---|---|---|---|
| 7,310,526 B2 | 12/2007 | Sang et al. | |
| 2002/0019231 A1* | 2/2002 | Palenius et al. | 455/437 |
| 2004/0023665 A1 | 2/2004 | Simmonds et al. | |

FOREIGN PATENT DOCUMENTS

| | | |
|---|---|---|
| EP | 1 081 972 A2 | 3/2001 |
| EP | 1 153 523 B1 | 11/2001 |
| JP | 09-252481 | 9/1997 |
| WO | WO-02/100125 | 12/2002 |

OTHER PUBLICATIONS

International Preliminary Report on Patentability for PCT/IB2005/001429 issued on Jan. 16, 2007.

Notice of Reasons for Rejection for Japanese Application 2007-520907, mailed Feb. 16, 2010 (with English Translation).

Janne Kurjenniemi et al., *Ultra TDD Handover Performance*, Globecom'01, IEEE Global Telecommunication Conf. Nov. 25-29, 2001, vol. 1, p. 533-537.

Vieri Vanghi et al., *WCDMA Handover Parameters Optimization*, 2004 IEEE Int. Conf. on Communications, Jun. 20-24, 2004, vol. 7, p. 4133-4137.

3GPP TS 25.331 V5.0.0 (Mar. 2002), Release 5, 14.2.Ob.2 TDD cells (p. 841).

Third Office Action for Chinese Application 200580023608.5, dated Mar. 8, 2010.

Office Property Action from Chinese Application 2005800236085 (with English translation), issued by the State Intellectual Property Office Apr. 3, 2009.

Fourth Office Action on Chinese Application 200580023608.5, mailed Jun. 8, 2010.

The Non-Final Rejection for Korean application No. 10-2007-7003505 dated Apr. 29, 2008.

Office Action for Chinese Patent Application 200580023608.5, mailed Oct. 9, 2009 (with English translation).

\* cited by examiner

FREQUENCY QUALITY CRITERIA FOR INTER-FREQUENCY HANDOVER IN A TD-CDMA COMMUNICATION SYSTEM

CROSS REFERENCE TO RELATED APPLICATIONS

This application is a continuation-in-part of U.S. patent application Ser. No. 10/891,829 filed Jul. 14, 2004, now abandoned from which priority is claimed under all applicable sections of Title 35 of the United States Code including, but not limited to, Sections 120, 121, and 365(c).

BACKGROUND OF THE INVENTION

1. Technical Field

The present invention pertains to the field of wireless communication. More particularly, the present invention pertains to criteria used in inter-frequency or inter-system handover in cellular communication.

2. Discussion of Related Art

TD-SCDMA (Time Division-Synchronized Code Division Multiple Access), also known as UTRA (Universal mobile telecommunications system (UMTS) Terrestrial Radio Access) TDD (time division duplex) 1.28 Mcps option, is a so-called 3G (third generation) wireless communication system that is supposed to be used for example in China, possibly along with two other 3G technologies—UTRA FDD version of WCDMA (Wideband CDMA) and CDMA2000. A TD-SCDMA system is therefore sometimes indicated as a TDD SCDMA system, and is also known as a Low Chip Rate (LCR) TDD system.

TD-SCDMA uses both TDMA (Time Division Multiple Access) and CDMA as multiple access methods, which means there are several possible slots for each transmitting direction on a single carrier, and in each slot one or more users, separated by orthogonal codes, can transmit or receive data simultaneously, one user can even occupy more than one timeslot during multi-slot mode.

Since TD-SCDMA uses a 1.6 MHz bandwidth, it has a low single-carrier capacity. Thus, a TD-SCDMA is usually implemented (by a network operator) using more than one carrier. Even so, to prevent a communication link from deteriorating because of over-capacity, inter-frequency handover (IFHO) must be performed relatively frequently. IFHO is also performed because of coverage, i.e. because of a user equipment (UE) (a cellular communication device, e.g. a cellular telephone) moving beyond the coverage of a network service access point (SAP), e.g. a so-called Node B.

TD-SCDMA uses hard handover (from one SAP to another, without a time interval during which the UE is in communication with both) instead of soft handover (includes a time interval during which the UE is in communication with two or more SAPs) to make the UE always connect to a single best cell. The quantity used to define how good a cell is, per the prior art, P-CCPCH RSCP (Primary-Common Control Physical CHannel Received Signal Code Power). After passing the cell-planning phase, the coverage area is decided by the antenna down tilt, gain map and Tx (transmit) power of P-CCPCH. The Tx power of P-CCPCH changes only rarely. Hence the coverage area of a cell also rarely changes. The cell-planning phase ensures that the best cell's P-CCPCH RSCP in the whole service area is above an acceptable threshold.

Based on where the UE is located in a service area, the P-CCPCH RSCP of all detectable cells would reflect the admission cost (power increase of the whole network for both directions) of the UE in that location. Estimation cost in slot 1 to slot 6 from measurement of slot 0, which is the slot used by P-CCPCH, would not be very accurate, but it would be sufficient on an average basis without information about other slots in the location. The potential downlink power increase after admitting the UE in the specific location is decided by both the path loss from the serving cell and the path loss from any interfering cells. The serving cell's P-CCPCH RSCP would only directly reflect the path loss from the serving cell, but it would also indirectly reflect the path loss from interfering cells. In other words, the serving cell's P-CCPCH RSCP is affected by and so indicates interference from interfering cells. So selecting a cell having the best P-CCPCH RSCP in one carrier as the serving cell is a UE's best choice for intra-frequency handover.

However, for inter-frequency handover cell quality criteria, selecting a cell having the best P-CCPCH RSCP is not always the best choice since a good P-CCPCH RSCP does not necessarily indicate low interference at slot 0 compared with other cells.

Thus, what is needed is a new decision algorithm by which to select a best cell during inter-frequency handover based on minimizing admission cost, and ideally, such an algorithm would also be of use in an inter-system handover decision to a TD-SCDMA system, i.e. from a radio access technology other than a TD-CDMA system (e.g. a GSM system) to a TD-SCDMA cell and carrier within the cell.

DISCLOSURE OF INVENTION

Accordingly, in a first aspect of the invention, a method (for use by e.g. a network element of a wireless communication system) is provided comprising: a step of selecting from a set of decision metrics including a decision metric related to coverage and a decision metric related to capacity, either the decision metric related to coverage or the decision metric related to capacity for use as a basis for deciding whether to perform a handover of a user equipment apparatus to a cell and carrier frequency of a time division code division multiple access cellular system; and a step of determining whether to perform the handover based on the selected decision metric, and if the determination is not to perform the handover, then determining whether to perform the handover based on the other decision metric.

In accord with the first aspect of the invention, the decision metric related to capacity for a cell and a carrier frequency of the cell may vary in direct proportion to the received signal code power for the cell and carrier frequency, and in inverse proportion to the difference between a received signal strength indicator for the cell and carrier frequency and the received signal code power for the cell and carrier frequency or in inverse proportion to quantities algebraically related so as to behave in a similar way.

Also in accord with the first aspect of the invention, the decision metric related to capacity for a cell and a carrier frequency of the cell may vary in direct proportion to the received signal code power for the cell and carrier frequency, and in inverse proportion to the total interference for the cell and carrier frequency or in inverse proportion to quantities algebraically related so as to behave in a similar way.

Also in accord with the first aspect of the invention, the step of determining whether to perform an interfrequency handover based on capacity may be based not only on the decision metric related to capacity, but also on a threshold for received signal code power.

In a second aspect of the invention, a computer program product is provided comprising a computer readable storage structure embodying computer program code thereon for execution by a computer processor, wherein said computer program code comprises instructions for performing a method according to the first aspect of the invention.

In a third aspect of the invention, a network element is provided, comprising: means for performing the steps of a method according to the first aspect of the invention.

In a fourth aspect of the invention, a method is provided comprising: a step in which a user equipment communicatively coupled to a cellular communication system providing time division code division multiple access receives an indication that a handover measurement is to be performed and that an indicated decision metric is to be used in ranking cells and corresponding carrier frequencies for possible handover; and a step in which the user equipment apparatus performs a handover measurement and ranks the results for different cells and carrier frequencies according to the decision metric; wherein the decision metric is either a decision metric related to capacity or a decision metric related to coverage.

In accord with the fourth aspect of the invention, the decision metric related to capacity for a cell and carrier frequency of the cell may be according to the first aspect of the invention.

In a fifth aspect of the invention, a computer program product is provided comprising a computer readable storage structure embodying computer program code thereon for execution by a computer processor included in a user equipment apparatus, wherein said computer program code comprises instructions for performing a method according to the fourth aspect of the invention.

In a sixth aspect of the invention, a user equipment apparatus is provided including equipment for communicatively coupling to a cellular communication system providing time division code division multiple access, comprising means for performing the steps of a method according to the fourth aspect of the invention.

In a seventh aspect of the invention, a system is provided, comprising: a network element according to the third aspect of the invention, and a user equipment apparatus coupled to the network element via a radio link.

In accord with the seventh aspect of the invention, the user equipment apparatus may be according to the sixth aspect of the invention.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
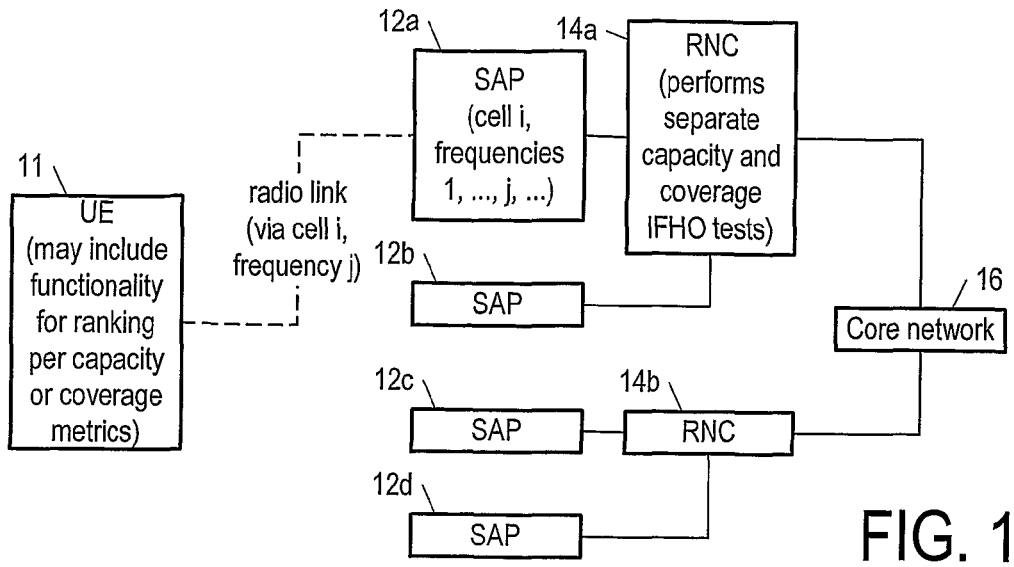
FIG. 1 is a block diagram showing a system of a type for which the invention can be used, and showing a network entity—and in particular a radio network controller—including means for performing a method according to the invention.

The invention provides an algorithm for use in deciding whether to handoff a UE from a current cell to a candidate cell and carrier frequency of the candidate cell of a radio access network (RAN) of a (multi-carrier) TD-CDMA cellular communication system, such as a TD-SCDMA cellular communication system, which is used in the below description as an exemplary TD-CDMA cellular system. The UE may be currently communicatively coupled to the RAN of the same TD-SCDMA via a current carrier frequency of the same or a different cell than the candidate cell, in which case the handover is an inter-frequency handover (IFHO), or it may be communicatively coupled to the RAN of a different cellular communication system (e.g. a GSM cellular communication system), in which case the handover is an inter-system/inter-RAT (radio access technology) handover (ISHO). In either case, an element of the current RAN uses the algorithm in deciding whether to handover the UE. For IFHO, the element using the algorithm may be the radio network controller (RNC) of the TD-SCDMA system, or it may be the SAP (service access point/Node B) of the TD-SCDMA system. For ISHO, the element is typically a base station controller (controlling one or more base station transceivers/SAPs), but it may also be a base station transceiver. The decision, in either case, is based on measurements made by the UE in respect to the candidate cell and carrier frequency.

According to the invention, the handover algorithm for TD-SCDMA (or other TD-CDMA system) includes a frequency criteria or metric for indicating the favorability of a handover for two different causes: one for coverage-caused link deterioration (i.e. for the case that a UE moves outside of the coverage area of a SAP/cell of a radio access network) and the other for over-capacity (i.e. for the case that a cell over which a UE is linked to a radio access network is linked to too many other UEs, causing a deterioration in the communication link to the UE). For coverage-caused handover, the handover metric can be the same as in the prior art, namely:

$$M^{(coverage)} = P_{RSC}, \quad (1)$$

where $P_{RSC}$ is P-CCPCH RSCP (for a particular cell i, not made express in the above, and for a particular frequency j, also not made express), i.e. the received signal code power for P-CCPCH (for a cell i). For over-capacity in a first embodiment of the invention, the handover metric can be:

$$M^{(capacity)} = P_{RSC}/(I_{RSS} - P_{RSC}), \quad (2)$$

(again for a particular cell i, not made express, and for a particular frequency j, also not made express) where $I_{RSS}$=UTRA Carrier RSSI (Received Signal Strength Indicator), which is used here to indicate the wideband power of slot 0. The quantity $I_{RSS} - P_{RSC}$ is a measure of the total interference power in slot 0, as explained below in the discussion for eqs. (6)-(8).

Other metrics for the handover capacity metric $M^{(capacity)}$ are possible according to the invention, but advantageously, any handover capacity metric according to the first embodiment of the invention exhibits the same general behavior as $M^{(capacity)}$ given by eq. (2) by virtue of being algebraically related. Thus, for example, the invention includes as possible formulae for $M^{(capacity)}$ any of the following:

$$[P_{RSC}/(I_{RSS} - P_{RSC})]^2,$$

$$P_{RSC}^2/(I_{RSS} - P_{RSC}),$$

$$P_{RSC}/(I_{RSS} - P_{RSC})^2,$$

$$P_{RSC}/(I_{RSS}^2 - P_{RSC}^2),$$

$$\log\{P_{RSC}/(I_{RSS} - P_{RSC})\}, \text{ or}$$

$$P_{RSC}/(I_{RSS} - P_{RSC} + \delta),$$

where δ is a small constant for regulating the behavior of $M^{(capacity)}$ when $I_{RSS}-P_{RSC}$ is small. Other formulae are of course also possible. According to the invention, any formula for $M^{(capacity)}$ takes into account both $P_{RSC}$ as well as how close $P_{RSC}$ is to $I_{RSS}$.

Thus, according to the invention, the decision algorithm used to decide whether to perform handover (to a particular cell and carrier frequency of a TD-SCDMA or other TD-CDMA system) tests for both over-capacity and coverage based link deterioration, and performs handover in case either test indicates that handover should be performed. For the capacity test, the best cell i (and a carrier frequency j of the cell)—and so the cell (and carrier frequency) to which handover would be performed—can be the cell having the highest $M^{(capacity)}$ and also having an acceptable P-CCPCH RSCP, i.e.:

$$\max_{i,j}\{M_{i,j}^{(capacity)}\}, \qquad (3)$$

where i indicates a neighboring cell and j the carrier frequency of the cell i, and $$P_{RSC}^{i,j} > P_{RSC}^{threshold} \qquad (4)$$

where $P_{RSC}^{threshold}$ is a P-CCPCH threshold designed to be several dB (deciBel) above a minimum required (e.g. by an accepted standard) P-CCPCH value. The threshold requirement given by eq. (4) is to avoid link deterioration because of inadequate coverage soon after a UE is handed over to a cell because of the limit on capacity in the cell from which the UE is handed over.

For a handover decision because of coverage, the best cell can be the cell having the highest P-CCPCH RSCP, as in the prior art, or having the largest $M^{(Icoverage)}$ value for any handover coverage metric (typically having the same general behavior as the quantity P-CCPCH RSCP).

A UE is advantageously (although not necessarily) adapted for use according to the invention by including in it functionality for ranking cells according to both kinds of the metrics described above. According to the prior art (as set forth e.g. in 3GPP TS 25.311, section 10.3.7.44), the measurement report sent from the UE to the RNC (or other element of the radio access network of the current cellular communication system) should rank cells from best to worst according to RSCP, as measured by the coverage metric, and so a UE according to the invention should include functionality for ranking cells in two ways: according to the coverage metric for coverage-caused handover and according to the capacity metric for capacity-caused handover.

The handover decision-maker (the RNC or other element of the radio access network of the current cellular communication system) advantageously then commands a UE to perform a frequency quality measurement and provide results either according to a capacity metric and/or a coverage metric, as described above. The downlink Ec/No according to the prior art (3GPP TS 25.311, section 14.2.0a) can be re-interpreted to indicate to the UE that it is to use a capacity metric as described above (e.g. P-CCPCH RSCP/UTRA Carrier RSSI (slot 0)) for the UTRA TDD 1.28 Mcps option. With such a change, when the measurement quantity (as indicated by FE-TDD where FE is the Frequency Quality Estimate Quantity) is set to primaryCCPCH-Ec-NO (as opposed to RSCP or path loss), the UE should use the capacity metric. When it is set to RSCP, the UE should use the coverage metric.

In other embodiments, the handover decision-maker receives from the UE the raw measurement results and itself performs the rankings according to either a coverage metric or a capacity metric. In such embodiments, the UE need not be at all changed to be used with the invention.

A decision algorithm according to the invention in an embodiment in which the current cellular communication system is TD-SCDMA advantageously resides in the RRM/HC (Radio Resource Management/Handoff Control) of the RNC (Radio Network Controller). The quantities P-CCPCH RSCP and UTRA Carrier RSSI are already supported in the RRC (Radio Resource Control) measurement report message specified by 3GPP TS 25.331, v500. Page 841 of 3GPP TS 25.331 v500 gives the following as a frequency quality metric for TDD (Time Division Duplex) used in determining whether to perform inter-frequency handover:

$$Q_{i,j} = 10 \cdot \text{Log}(M_{i,j}) + O_{i,j} \qquad (5)$$

where $Q_{i,j}$ is the estimated quality of cell i on frequency j. $M_{i,j}$ is the measurement result for Primary CCPCH RSCP of cell i on frequency j expressed in mW, and $O_{i,j}$ is the cell individual offset (set by the information element (IE) called "cell individual offset") of the currently evaluated cell i on frequency j. The invention can be implemented to use the frequency quality metric given by eq. (5), but using two different $M_{i,j}$: $M_{i,j}^{(coverage)}$ for coverage, and $M_{i,j}^{(capacity)}$ for capacity, as explained above.

Thus, and now referring to FIG. 1, the invention is described for handover from a current cell and carrier frequency of a TD-SCDMA system to a target cell and carrier frequency of the same TD-SCDMA system in a case where the target cell is a cell of a different SAP. Thus, as shown in FIG. 1, a UE 11 is physically located so as to be able to establish wireless communication with a radio network controller 14a and on to a core network 16 (and ultimately another communication terminal or server, not shown) via a radio link to a current SAP 12a having a cell i and using a carrier frequency j from among the various carrier frequencies 1, ..., j, ..., N available for use with the SAP 12a. A handover is performed to another SAP 12b-d because of deterioration in the radio link with the current SAP 12a due to either the UE having moved outside of the cell i (or having moved to a location where coverage from another of the SAPs 12b-d is superior) or because of too many users in the cell i. The UE is handed over to a cell and carrier frequency of another of the SAPs 12b-d (each providing a different cell than cell i) of the TD-SCDMA system, according to the invention as described above, i.e. using a metric for coverage and a metric for capacity to select the cell and carrier frequency from among candidate cells and carrier frequencies (of the same or other SAPS of the TD-SCDMA system).

As indicated above, a radio access network (the RNCs and SAPS) implementing a TD-SCDMA (or other TD-CDMA system) can have several different carriers to use, and can use some in one cell and some (the same or different) in others of the cells. Thus, the carrier frequencies for two cells may overlap partially, wholly, or not at all. Typically, though, at least one carrier frequency is used in all of the cells in order to provide for continuous coverage in the service area, and other carrier frequencies are used in addition only where demand is high. (Note also that the coverage areas of the different carrier frequencies for a cell need not be the same within the cell.)

Figure 2:
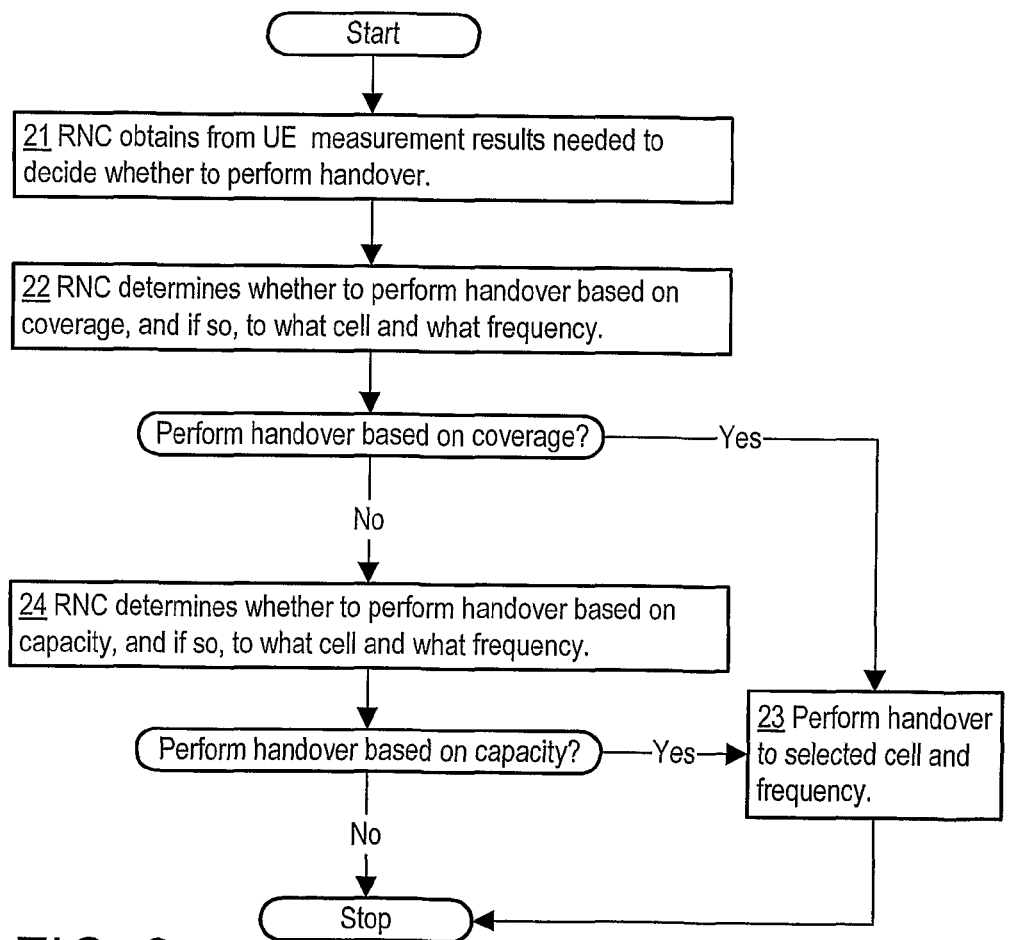
FIG. 2 is a flow chart of a method according to the invention (for execution by a network entity, such as a radio network controller).

Referring now also to FIG. 2, the process of deciding whether to perform handover—and if so to what cell and carrier frequency—is shown as including a first step 21 in which an RNC of a radio access network obtains from a UE measurement results needed to decide whether to perform handover (for example, using messaging according to the prior art). In a next step 22, the RNC determines whether to perform handover based on coverage, and if so, to what cell and what frequency, using the measurement results provided by the UE. This determination can be made as in the prior art, e.g. as set out in 3GPP TS 25.331, v.500 (see page 841). If the outcome of the test indicates that handover should be performed, then in a next step 23, the handover is performed so as to possibly hand off the UE 11 to another of the SAPs 12b-d, and so as to possibly change the carrier frequency. If the measurements instead indicate that handover is not needed based on coverage, then in a next step 24, the RNC determines whether to perform handover based on capacity, and if so, to what cell and what frequency, using e.g. eqs. (3) and (4), but at any rate using a different metric than that used for determining whether handover is needed based on coverage, and more particularly, a metric suitable for a handover decision because of inadequate capacity for the number of UEs currently linked to the radio access network. If the measurements indicate that handover is needed based on capacity, then the step 23 of performing handover is performed. Clearly, the determining of whether to perform handover based on coverage may be performed either before or after determining whether to perform handover based on capacity, and the order is advantageously tailored to each RNC 14a-b.

As explained above, the invention provides a method and it also provides corresponding equipment consisting of various modules providing the functionality for performing the steps of the method. The modules may be implemented as hardware, or may be implemented as software or firmware for execution by a processor. In particular, in the case of firmware or software, the invention can be provided as a computer program product including a computer readable storage structure embodying computer program code—i.e. the software or firmware—thereon for execution by a computer processor.

Figure 3:
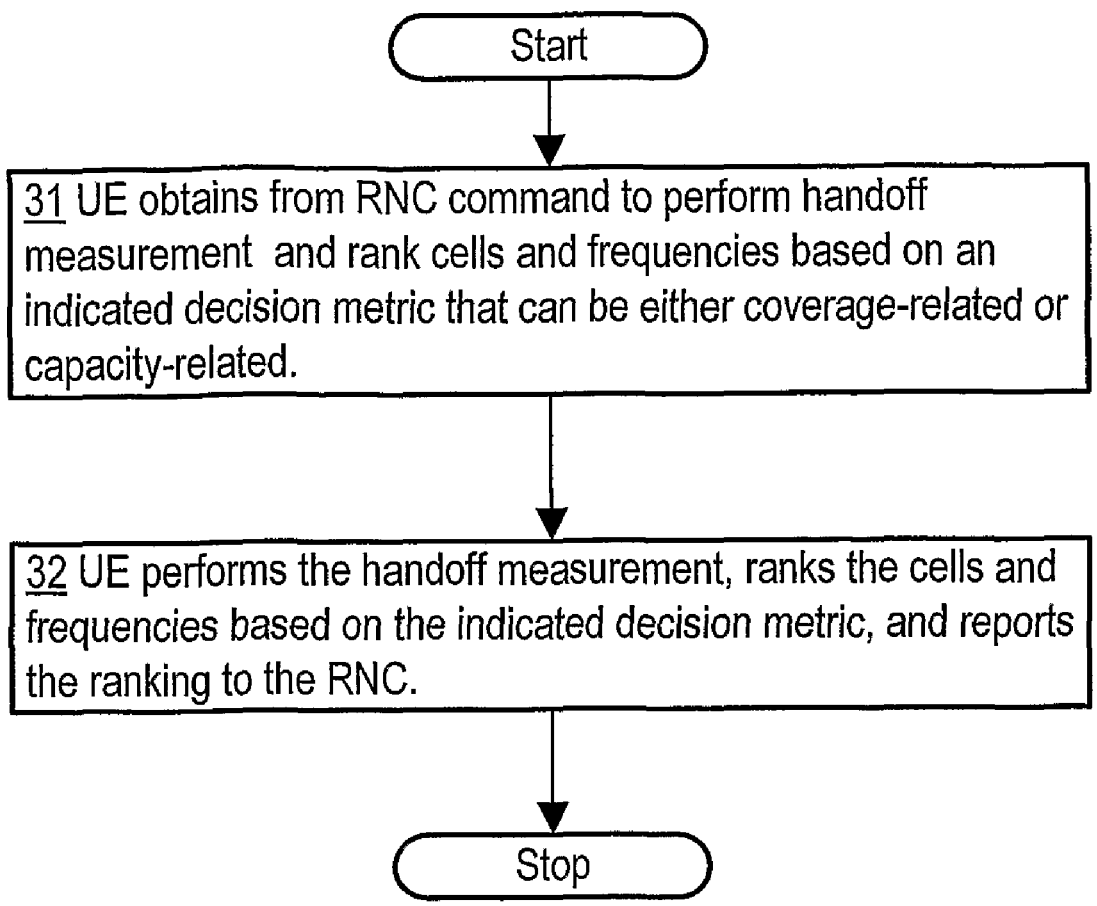
FIG. 3 is a flow chart showing operation of a UE according to the invention.

Referring now to FIG. 3, in embodiments in which the UE itself performs rank orderings of cells and frequencies according to a decision metric, the invention provides a method according to which the UE is operative and including a first step 31 in which the UE receives from the RNC of a radio access network a command to perform a frequency measurement for possible handover and to then rank cells and frequencies based on an indicated decision metric that can be either coverage-related or capacity-related. In a next step 32, the UE performs the frequency measurement, ranks the cells and frequencies based on the indicated decision metric, and reports the ranking to the RNC.

Now in the above-described procedure, the metric for handing over to a particular cell and carrier within the cell based on inadequate capacity (i.e. eq. (2)), includes as a factor the inverse of a measure of the total interference, $$I_{RSS} - P_{RSC},$$

(for a particular cell i, not made express, and for a particular frequency j, also not made express). As explained above, $I_{RSS}$=UTRA Carrier RSSI (Received Signal Strength Indicator), i.e. the wideband power of slot 0.

Note that the received signal strength indicator $I_{RSS}$ for a UTRA carrier in a TD-SCDMA system can be written as follows:

$$I_{RSS} = P_{RSC} + I_{Intra} + I_{Inter} + N_{thermal},  \quad (6)$$

where $N_{thermal}$ is thermal noise power, $I_{Intra}$ is the intra-cell interference power caused by any traffic channels allocated on TS0, and $I_{Inter}$ is the inter-system or the inter-cell interference power, depending on the situation. So:

$$I_{RSS} - P_{RSC} = I_{Intra} + I_{Inter} + N_{thermal}.  \quad (7)$$

which, as noted above, is a measure of the total interference.

Now since multi-user detection (MUD) is used in TD-SCDMA systems to cancel intra-cell interference (i.e. so-called multi-access interference), the total interference for a carrier and cell of a TD-SCDMA system is, in general:

$$I_{total} = (1 - F_{MUD}) * I_{Intra} + I_{Inter} + N_{thermal},  \quad (8)$$

where the quantity $F_{MUD}$ is usually in the range of 0.8 to 0.9, and may be even higher (closer to one). Thus, both eqs. (6) and (8) are measures of the total interference for a carrier and cell of a (multi-carrier) TD-SCDMA system, but eq. (8) is more general, i.e. it gives more accurate results in case of a non-zero MUD factor.

Thus, in a second aspect of the invention, instead of using eq. (2) for the metric for handover because of favorable capacity (in the target cell and carrier frequency), i.e.

$$M^{(capacity)} = P_{RSC}/(I_{RSS} - P_{RSC})$$

a metric is used taking into account the multi-user detection, i.e.

$$M^{(capacity)} = P_{RSC}/I_{total}  \quad (9)$$

where $I_{total}$ is given by eq. (8).

In deciding on handoff, a two-step procedure is advantageously used, one in which first, a set of neighboring cells is determined using traditional RSCP-based methods for determining appropriate neighboring cells, which means the path loss value of the neighboring cell must be smaller than a pre-defined threshold. And second, the most suitable target cell is selected by a signal quality criterion according to the invention, i.e. by a metric providing a value favoring handoff to a particular cell and carrier taking into account total interference ($I_{total}$) and also signal to interference (i.e. $P_{RSC}$) for candidate cells. The two-step selection method is helpful in eliminating the inaccuracy inherent in an RSCP measurement.

In an exemplary embodiment of the two-step procedure, in the first step all neighboring cells satisfying a predetermined criteria are selected as candidate cells. The predetermined criteria could be, for example:

$P_{RSC}$ is P-CCPCH RSCP (for a particular cell i, not made express in the above, and for a particular frequency j, also not made express)

$$P_{RSC}(n) > P_{RSC,req}  \quad (10)$$

where $P_{RSC}(n)$ is the average received signal power on P-CCPCH from cell n and for a particular carrier of cell n, and $P_{RSC,req}$ is the minimum required P-CCPCH RSCP (in e.g. dBm) in the neighboring cells, which value is typically set by the serving RNC. When a UE for which handover is being considered determines $P_{RSC}(n)$ to report its value to the serving RNC (or equivalent entity in another RAT system), the UE averages the measured RSCP value directly over the time period of the measurement window, i.e. over the length of time the RSCP value is measured.

The next step is decide on whether to perform handover for either coverage, using e.g. the coverage metric of eq. (1), or for capacity, using the capacity metric of either eq. (2) or (9).

The quantity used for the capacity metric according to eq. (9) can be written in terms of $I_{RSS} - P_{RSC}$ appearing in the capacity metric according to eq. (2), which an be referred to as the received wideband power. Writing $$P_{RSSI} = I_{RSS} - P_{RSC} = I_{intra} + I_{Inter} + N_{thermal} = I_{own} + I_{other} + N_{thermal}$$

and defining $$i = \frac{I_{other}}{I_{own}}$$

provides $$I_{total} = P_{RSSI} - \frac{F_{MUD}}{1+i}(P_{RSSI} - N_{thermal})$$

so that $$M^{(capacity)} = \frac{P_{RSC}}{I_{total}} = \frac{P_{RSC}}{P_{RSSI} - \frac{F_{MUD}}{1+i}(P_{RSSI} - N_{thermal})}.$$

Thus, from a measurement of both P-CCPCH RSCP and RSSI, a UE can estimate the load or interference level of a target cell. Combining this information with path loss, the RNC can make what is sometimes a better choice of a neighboring cell for handoff.

It should be noted that the accuracy of $I_{total}$ depends on the RSSI measurement. So to get a more accurate RSSI measurement for purposes of deciding which cell and frequency to handover to, only the time slots carrying traffic channels should be taken into account; the special time slots conveying common control/broadcast/synchronization channels, such as TS0, DwPTS and UpPTS, should be excluded from the measurement.

As indicated above, the invention is especially advantageous in case of TD-SCDMA. More generally, the invention is of use in any TD-CDMA (Time Division-Code Division Multiple Access) communication system, and so e.g. can also be used for the UTRA TDD (time Division Duplex) 3.84 Mcps option.

Advantages of the invention are that it takes into account the possible cite density differences of different frequencies, that the capacity caused IFHO tends to select a carrier in which cites are sparse, and that since MUD can cancel most of the intra-cell interference, the single cell capacity of sparse cites is much larger than that of a continuous coverage carrier. Further, the intra-frequency handover algorithm is unaffected by the invention, and also the measurement control and measurement report in inter-frequency measurement need not change.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method comprising:
   selecting, at a network element, a first decision metric related to coverage or a second decision metric related to capacity as a basis for deciding whether to perform a handover of a user equipment apparatus to a cell and carrier frequency of a time division code division multiple access cellular system; and
   determining, at the network element, whether to perform the handover based on the selected decision metric, and if the determination is not to perform the handover, determining whether to perform the handover based on the other of the first or second decision metric;
   wherein the second decision metric varies in direct proportion to a received signal code power for the cell and carrier frequency, and in inverse proportion to a difference between a received signal strength indicator for the cell and carrier frequency and the received signal code power for the cell and carrier frequency or to a quantity algebraically related to the difference.

2. A method as in claim 1, wherein if determining whether to perform a handover based on capacity, further determining based on comparing a received signal code power to a threshold for the received signal code power.

3. A method comprising:
   selecting, at a network element, a first decision metric related to coverage or a second decision metric related to capacity as a basis for deciding whether to perform a handover of a user equipment apparatus to a cell and carrier frequency of a time division code division multiple access cellular system; and
   determining, at the network element, whether to perform the handover based on the selected decision metric, and if the determination is not to perform the handover, determining whether to perform the handover based on the other of the first or second decision metric;
   wherein the second decision metric varies in direct proportion to a received signal code power for the cell and carrier frequency, and in inverse proportion to a total interference for the cell and carrier frequency or to a quantity algebraically related to the total interference.

4. A method as in claim 3, wherein if determining whether to perform a handover based on capacity, further determining based on comparing a received signal code power to a threshold for the received signal code power.

5. A non-transitory computer-readable medium having instructions stored thereon that, if executed by a computing device, cause the computing device to perform operations comprising:
   selecting a first decision metric related to coverage or a second decision metric related to capacity as a basis for deciding whether to perform a handover of a user equipment apparatus to a cell and carrier frequency of a time division code division multiple access cellular system; and
   determining whether to perform the handover based on the selected decision metric, and if the determination is not to perform the handover, determining whether to perform the handover based on the other of the first or second decision metric;
   wherein the second decision metric varies in direct proportion to a received signal code power for the cell and carrier frequency, and in inverse proportion to a difference between a received signal strength indicator for the cell and carrier frequency and the received signal code power for the cell and carrier frequency or to a quantity algebraically related to the difference.

6. A network element comprising:
   means for selecting a first decision metric related to coverage or a second decision metric related to capacity as a basis for deciding whether to perform a handover of a user equipment apparatus to a cell and carrier frequency of a time division code division multiple access cellular system; and means for determining whether to perform the handover based on the selected decision metric, and if the determination is not to perform the handover, determining whether to perform the handover based on the other of the first or second decision metric;

wherein the second decision metric varies in direct proportion to a received signal code power for the cell and carrier frequency, and in inverse proportion to a difference between a received signal strength indicator for the cell and carrier frequency and the received signal code power for the cell and carrier frequency or to a quantity algebraically related to the difference.

7. A network element as in claim 6, wherein the means for determining whether to perform a handover when based on capacity is further configured to compare a received signal code power to a threshold for the received signal code power.

8. A network element comprising:
means for selecting a first decision metric related to coverage or a second decision metric related to capacity as a basis for deciding whether to perform a handover of a user equipment apparatus to a cell and carrier frequency of a time division code division multiple access cellular system; and
means for determining, at the network element, whether to perform the handover based on the selected decision metric, and if the determination is not to perform the handover, determining whether to perform the handover based on the other of the first or second decision metric;
wherein the second decision metric varies in direct proportion to a received signal code power for the cell and carrier frequency, and in inverse proportion to a total interference for the cell and carrier frequency or a quantity algebraically related to the total interference.

9. A network element comprising:
a selection module configured to select a first decision metric related to coverage or a second decision metric related to capacity as a basis for deciding whether to perform a handover of a user equipment apparatus to a cell and carrier frequency of a time division code division multiple access cellular system; and
a determination module configured to determine whether to perform the handover based on the selected decision metric, and if the determination is not to perform the handover, determining whether to perform the handover based on the other of the first or second decision metric;
wherein the second decision metric varies in direct proportion to a received signal code power for the cell and carrier frequency, and in inverse proportion to a difference between a received signal strength indicator for the cell and carrier frequency and the received signal code power for the cell and carrier frequency or to a quantity algebraically related to the difference.

10. A network element as in claim 9, wherein the determination module is further configured to compare a received signal code power to a threshold for the received signal code power.

11. A network element comprising:
a selection module configured to select a first decision metric related to coverage or a second decision metric related to capacity as a basis for deciding whether to perform a handover of a user equipment apparatus to a cell and carrier frequency of a time division code division multiple access cellular system; and
a determination module configured to determine whether to perform the handover based on the selected decision metric, and if the determination is not to perform the handover, determining whether to perform the handover based on the other of the first or second decision metric;
wherein the second decision metric varies in direct proportion to a received signal code power for the cell and carrier frequency, and in inverse proportion to a total interference for the cell and carrier frequency or to a quantity algebraically related to the total interference.

12. A network element as in claim 11, wherein the determination module is further configured to compare a received signal code power to a threshold for the received signal code power.

13. A method comprising:
selecting, at a network element, from among a first decision metric related to coverage and a second decision metric related to capacity, the second decision metric as a basis for deciding whether to perform an interfrequency handoff of a user equipment apparatus; and
determining, at the network element, whether to perform the interfrequency handover using only the selected second decision metric;
wherein the second decision metric varies in inverse proportion to a difference between a received signal strength indicator for a cell and a carrier frequency and a received signal code power for the cell and carrier frequency, or to a quantity algebraically related to the difference.

14. A method comprising:
selecting, at a network element, from among a first decision metric related to coverage and a second decision metric related to capacity, the second decision metric as a basis for deciding whether to perform an interfrequency handoff of a user equipment apparatus; and
determining, at the network element, whether to perform the interfrequency handover using only the selected second decision metric;
wherein the second decision metric is a received signal code power for a cell and a carrier frequency divided by a difference between a received signal strength indicator for the cell and the carrier frequency and a received signal code power for the cell and the carrier frequency or a quantity algebraically related to the difference.

15. A non-transitory computer-readable medium having instructions stored thereon that, if executed by a computing device, cause the computing device to perform operations comprising:
selecting, from among a first decision metric related to coverage and a second decision metric related to capacity, the second decision metric as a basis for deciding whether to perform an interfrequency handoff of a user equipment apparatus; and
determining whether to perform the interfrequency handover using only the selected second decision metric;
wherein the second decision metric varies in inverse proportion to a difference between a received signal strength indicator for a cell and a carrier frequency and a received signal code power for the cell and carrier frequency, or to a quantity algebraically related to the difference.

16. A network element comprising:
means for selecting from among a first decision metric related to coverage and a second decision metric related to capacity, the second decision metric as a basis for deciding whether to perform an interfrequency handoff of a user equipment apparatus; and
means for determining whether to perform the interfrequency handover using only the selected second decision metric;

wherein the second decision metric varies in inverse proportion to a difference between a received signal strength indicator for a cell and a carrier frequency and a received signal code power for the cell and carrier frequency, or to a quantity algebraically related to the difference.

17. A network element comprising:
means for selecting from among a first decision metric related to coverage and a second decision metric related to capacity, the second decision metric as a basis for deciding whether to perform an interfrequency handoff of a user equipment apparatus; and
means for determining whether to perform the interfrequency handover using only the selected second decision metric;
wherein the second decision metric is a received signal code power for a cell and a carrier frequency divided by a difference between a received signal strength indicator for the cell and the carrier frequency and a received signal code power for the cell and the carrier frequency or a quantity algebraically related to the difference.

18. A network element comprising:
a selection module configured to select from among a first decision metric related to coverage and a second decision metric related to capacity, the first second decision metric as a basis for deciding whether to perform an interfrequency handoff of a user equipment apparatus; and
a determination module configured to determine whether to perform the interfrequency handover using only the second selected decision metric;
wherein the second decision metric varies in inverse proportion to a difference between a received signal strength indicator for a cell and a carrier frequency and a received signal code power for the cell and carrier frequency, or to a quantity algebraically related to the difference.

19. A non-transitory computer-readable medium having instructions stored thereon that, if executed by a computing device, cause the computing device to perform operations comprising:
selecting, from among a first decision metric related to coverage and a second decision metric related to capacity, the second decision metric as a basis for deciding whether to perform an interfrequency handoff of a user equipment apparatus; and
determining whether to perform the interfrequency handover using only the selected second decision metric;
wherein the second decision metric is a received signal code power for a cell and a carrier frequency divided by a difference between a received signal strength indicator for the cell and the carrier frequency and a received signal code power for the cell and the carrier frequency or a quantity algebraically related to the difference.

20. A network element comprising:
a selection module configured to select from among a first decision metric related to coverage and a second decision metric related to capacity, the second decision metric as a basis for deciding whether to perform an interfrequency handoff of a user equipment apparatus; and
a determination module configured to determine whether to perform the interfrequency handover using only the second selected decision metric;
wherein the second decision metric is a received signal code power for a cell and a carrier frequency divided by a difference between a received signal strength indicator for the cell and the carrier frequency and a received signal code power for the cell and the carrier frequency or a quantity algebraically related to the difference.

* * * * *

UNITED STATES PATENT AND TRADEMARK OFFICE
CERTIFICATE OF CORRECTION

PATENT NO. : 8,190,157 B2
APPLICATION NO. : 11/631497
DATED : May 29, 2012
INVENTOR(S) : Zhu et al.

Page 1 of 1

It is certified that error appears in the above-identified patent and that said Letters Patent is hereby corrected as shown below:

Title Page, in Field (54), in Title, in Column 1, Line 2, and in Column 1, Line 2, delete "INTER-FREQUENCY HANDOVER IN A" and insert -- HANDOVER IN --, therefor.

Title Page, in Field (57), under "ABSTRACT", in Column 2, Line 9, delete "frequency" and insert -- frequency) --, therefor.

On Title Page 2, in Field (56), under "OTHER PUBLICATIONS", in Column 2, Line 8, delete "Office Property Action" and insert -- Office Action --, therefor.

In Column 6, Line 54, delete "SAPS" and insert -- SAPs --, therefor.

In Column 6, Line 56, delete "SAPS)" and insert -- SAPs) --, therefor.

In Column 7, Line 67, in Equation 6, delete "$I_{intra}$" and insert -- $I_{Intra}$ --, therefor.

In Column 8, Line 66, delete "an" and insert -- can --, therefor.

In Column 9, Line 1, delete "$I_{intra}$" and insert -- $I_{Intra}$ --, therefor.

Signed and Sealed this
Thirtieth Day of October, 2012

David J. Kappos
*Director of the United States Patent and Trademark Office*